United States Patent
Ma et al.

(10) Patent No.: US 6,534,107 B1
(45) Date of Patent: Mar. 18, 2003

(54) QUALITY FRUIT JUICE BEVERAGES HAVING EXTENDED QUALITY SHELF-LIFE AND METHODS OF MAKING THE SAME

(75) Inventors: Sheng Xue Ma, Altamonte Springs, FL (US); Mark Witold Lada, Lake Mary, FL (US)

(73) Assignee: The Coca-Cola Company, Atlanta, GA (US)

( * ) Notice: Subject to any disclaimer, the term of this patent is extended or adjusted under 35 U.S.C. 154(b) by 0 days.

(21) Appl. No.: 09/570,243

(22) Filed: May 12, 2000

(51) Int. Cl.$^7$ ................................................ A23L 2/02
(52) U.S. Cl. ..................................... 426/330.5; 426/599
(58) Field of Search .............................. 426/330.3, 599, 426/330.5, 271

(56) References Cited

U.S. PATENT DOCUMENTS

| | | | |
|---|---|---|---|
| 3,437,491 A | * | 4/1969 | Peterson |
| 3,801,717 A | * | 4/1974 | Huffman |
| 3,989,854 A | | 11/1976 | Veness et al. |
| 4,156,026 A | * | 5/1979 | Gogel |
| 4,297,220 A | | 10/1981 | Meitzner et al. |
| 4,439,458 A | | 3/1984 | Puri |

(List continued on next page.)

FOREIGN PATENT DOCUMENTS

| | | |
|---|---|---|
| EP | 0 357 130 | 3/1990 |
| EP | 0 334 641 B1 | 3/1994 |
| EP | 0613622 | 9/1994 |
| EP | 0 562 100 B1 | 12/1996 |
| EP | 0 587 869 B1 | 5/1997 |
| JP | 59039276 A | 3/1984 |
| JP | 61058565 | 7/1986 |
| JP | 05255097 A | 10/1995 |
| WO | WO9807332 | 2/1998 |

OTHER PUBLICATIONS

Matthews et al., *Removal of Limonin and Naringin from Citrus Juice by Styrene–Divinybenzene Resins*, Food Technology, Institute of Food Technologists, Apr. 1, 1990, pp. 130, 132.

Harnandez et al., *Evaluation of ultrafiltration and adsorption to debitter grapefruit juice and grapefruit pulp wash*, Journal of Food Science, vol. 57, No. 3, pp. 664–666, 670.

Walsh et al., *Determination of furaneol and p–vinylguaiacol in orange juice employing differential UV wavelength and fluorescence detection with a unified solid phase extraction*, Journal of Agricultural and Food Chemistry, vol. 45, No. 4, 1997, pp. 1320–1324.

Naim, *Effects of orange juice fortification with thiols on p–vinylguaiacol formation, ascorbic–acid degradation, browning, and acceptance during pasteurization and storage under moderate conditions*, Journal of Agricultural and Food Chemistry, vol. 45, No. 5, 1997, pp. 1861–1867.

Kawaii et al., *HL–60 differentiating activity and flavonoid content of the readily extractable fraction prepared from citrus juices*, Journal of Agricultural and Food Chemistry 47 (1) pp. 128–135 1999.

*Primary Examiner*—Carolyn Paden
(74) *Attorney, Agent, or Firm*—Sutherland Asbill & Brennan LLP

(57) ABSTRACT

A method and system for enhancing the flavor of a fruit juice and a fruit juice made according to these methods. Additionally, the methods may be used to produce a shelf-stable fruit juice that is capable of being stored in non-refrigerated conditions for extended periods of time without the development of off-flavors. The methods comprise passing the fruit juice through an adsorbent resin which substantially reduces the off-flavor compounds and/or the precursors of off-flavors thereby making a juice which tastes better immediately. Additionally, since substantial amount of the precursors are removed, the off-flavors will not develop, thereby allowing the juice to be stored under non-refrigerated conditions for one or more months without significant degradation of the flavor of the juice.

9 Claims, 1 Drawing Sheet

U.S. PATENT DOCUMENTS

| | | | |
|---|---|---|---|
| 4,514,427 A | * | 4/1985 | Mitchell |
| 4,643,902 A | * | 2/1987 | Lawhon |
| 4,898,742 A | * | 2/1990 | Shrikhande |
| 4,933,197 A | * | 6/1990 | Walker |
| 4,970,085 A | * | 11/1990 | Persson |
| 4,975,293 A | * | 12/1990 | Hicks |
| 5,049,402 A | * | 9/1991 | Tamaki |
| 5,071,664 A | * | 12/1991 | Brown |
| 5,244,684 A | * | 9/1993 | Tong |
| 5,298,486 A | | 3/1994 | Thomas et al. |
| 5,411,755 A | * | 5/1995 | Downton |
| 5,756,141 A | * | 5/1998 | Chen |
| 5,792,502 A | * | 8/1998 | Montezinos |
| 5,935,630 A | * | 8/1999 | Pearce |
| 6,020,018 A | * | 2/2000 | Tong |
| 6,045,842 A | | 4/2000 | Mozaffar et al. ............ 426/271 |
| 6,054,168 A | * | 4/2000 | Lioutas |

* cited by examiner

QUALITY FRUIT JUICE BEVERAGES HAVING EXTENDED QUALITY SHELF-LIFE AND METHODS OF MAKING THE SAME

FIELD OF THE INVENTION

The present invention is directed to a system and method for enhancing the quality including taste and flavor of beverages, such as fruit juices. The present invention is additionally directed to a fruit juice beverage having extended quality shelf-life without the development of off-taste and/or off-flavor characteristics.

BACKGROUND OF THE INVENTION

The production of beverages has grown increasingly complex. Today's consumers drink a widening array of beverages with different flavors and formulations. Many of these consumers are consuming fruit juices for taste and nutritional reasons.

Commercially produced fruit juice beverages are typically made with either concentrate or single strength juice. Beverages manufactured from juice concentrates are made by concentrating fruit juice, reconstituting the juice, and adding flavorings and/or other additives to form a finished fruit juice, which may then be packaged and stored. The juice may also be treated as needed to remove undesirable components such as bitterness components to make the finished juice beverage more palatable.

Certain taste and quality associated problems with current juice beverage systems are related to the manner in which the juices are packaged and stored. Many juices, especially citrus juices, need to be stored at refrigerated or reduced temperatures to prevent spoilage. Some of these juices will develop an off-taste or off-flavor if they are stored at room temperature or above for extended periods of time, so storage at refrigerated or reduced temperatures helps to maintain taste, flavor, and other qualities. These refrigerated products require more complex shipping, handling and retailing procedures. Also, consumers must store such juices in a refrigerated environment, even if they do not plan on using the juice immediately. Finally, refrigerated space is limited or non-existent in certain retail or consumption environments.

Spoilage problems have been addressed, in part, by the development of shelf-stable juices that retain acceptable microbiological levels for a certain period of time. As used herein, "biologically shelf-stable" refers to a juice that does not spoil due to microbial contamination when stored in non-refrigerated conditions for an extended period of time. However, these shelf-stable juices may suffer from off-taste and/or off-flavor in a short time period, for example as little as one month or less under room-temperature storage.

In addition to off-taste and off-flavor which may be developed, certain fruit juices contain off-flavor components prior to storage. Certain processes have been developed for improving the taste of these fruit juices. One such process is directed to the removal of bitterness components from grapefruit juice, such as naringin, to improve the overall taste of the juice. Bitterness is reduced by passing the juice through a resin column containing a resin that selectively removes the desired bitterness component. However, these treated juices still require refrigeration to prevent the development of off-tastes and/or off-flavor over time if stored at room temperature. Additionally, this process is only effective for juices that contain certain bitterness components. For example, grapefruit juice and navel orange juice that have large amounts of naringin and limonin, respectively, have been known to benefit from these processes designed to remove bitterness components. However, these debittered grapefruit juice or debittered navel orange juice are normally used as an ingredient that blends with other regular juice to make juice beverage.

Certain juices have been found to have quality problems associated with taste, color and other characteristics that exist for reasons other than the presence of such bitterness compounds. One such issue is the development of undesirable off-taste and off-flavor that occur in certain juices over time under non-refrigerated storage conditions.

Accordingly, there is a need for a method and system for enhancing and maintaining the flavor of certain fruit juices. Also, there is a need for a method and system for producing a shelf-stable fruit juice beverage with desired quality aspects. Finally, there is a need for a fruit juice beverage having extended quality shelf-life without the development of undesirable taste or flavor characteristics.

SUMMARY OF THE INVENTION

Accordingly, it is an object of the present invention to provide a system and method for enhancing the quality, including the flavor and taste, of a beverage.

It is another object of the present invention to provide a system and method for removing off-flavors or precursors of off-flavors from fruit juices to produce a fruit juice beverage that maintains its flavor and taste quality for an extended period of time. Such extension of the life of quality-related characteristics such as flavor, taste, color, odor, mouthfeel and other sensory characteristics shall be referred to as "quality shelf life" herein.

It is yet another object of the present invention to provide a system and method for treating a fruit juice to improve and extend the quality shelf life by treatment with an adsorbent resin designed to remove off-flavors or precursors of the off-flavors that cause off-taste.

It is yet another object of the present invention to provide a system and method for producing a fruit juice beverage having an extended quality shelf life.

It is yet another object of the present invention to provide fruit juices with enhanced quality and taste without nutritional loss.

Other objects, features and advantages of the present invention will become apparent from the following description, drawings, and claims.

The present invention fulfills the above-described objects by providing a system and method for enhancing the quality, including flavor and taste, of beverages. In particular, the present invention is directed to a system and method for enhancing the quality, including the flavor and taste, of fruit juices, and especially citrus juices. Additionally, the present invention is directed to a system and method for increasing the quality shelf-life of beverages. Finally, the present invention is directed to a fruit juice beverage having extended quality shelf-life without the development of off-taste or other non-quality characteristics.

The present invention includes a system and method which utilizes an adsorption resin to remove the off-flavors or precursors of off-flavors from the fruit juice. By removing these off-flavors or precursors, the present invention produces a finished fruit juice beverage with quality characteristics, such as flavor or taste, that may be maintained for an extended time period. The precursors of off-flavors are typically those which, if not removed, will degrade itself or react with other compounds in the juice over a period of time to produce a juice which has an off-taste and/or off-flavor.

In certain fruit juices, quality impacting off-flavors may be the result of off-flavor compounds in the juice or may be formed from precursors to these off-flavors, such as, for example, precursor compounds. Precursor compounds are present in small amounts in fresh juice. Therefore, these precursors do not adversely affect the taste of the fresh juice. However, over a period of time (about one month in the case of orange juice), the precursors will react with other components in the juices or degrade to produce an undesirable off-taste and/or off-flavor in the juice if the juice is left in a non-refrigerated environment. The present invention, however, provides a fruit juice beverage with substantially reduced amounts of these off-flavors and/or precursors such that the juice will not only taste better after treatment, but will also maintain its taste quality over an extended period of time, even if stored at room temperature.

The present invention is able to remove these off-flavor compounds and/or precursors by treating the juice with an adsorbent resin. This resin is selected to remove the precursors of off-flavors, such as phenolic compounds, to produce a finished juice product that has and maintains improved taste. The resin treatment step may be used at any point in the beverage production system since the precursors are present in the fresh juice product, and their removal does not adversely affect the remainder of the process by which the finished juice product is generated.

Therefore, by removing quality impacting off-flavor precursors in certain juices, the present invention is also able to produce a finished juice product with an extended quality shelf-life. If such a product is produced as a shelf stable product that is able to be stored at room temperature at acceptable levels of biological contamination, then the juice will also not spoil and is considered to be biologically shelf-stable. A shelf stable product with an extended quality shelf life means a juice that may be stored at room temperature, i.e. from about 65° F. to about 100° F., for a period in excess of one month, with a minimal increase in off-flavor and/or off-taste, a corresponding minimal decrease in desirable quality attributes of taste and flavor, and without microbial spoilage. However, the present invention may also be used on non-shelf stable juices, i.e. those that must be frozen or refrigerated to prevent microbial spoilage.

An added benefit of removing these off-flavor precursors is that the system and method may be used to produce a fruit juice beverage having extended quality shelf-life. Not only will freshly treated juice maintain its taste for longer time periods, but by removing a substantial amount of off-flavor and/or its precursors during production of the finished juice product, the juice will be capable of being stored at room temperatures for periods of time in excess of one month, without developing off-taste and/or off-flavor characteristics that have negatively impacted non-quality shelf-life juices of the prior art.

DETAILED DESCRIPTION OF THE INVENTION

Figure 1:
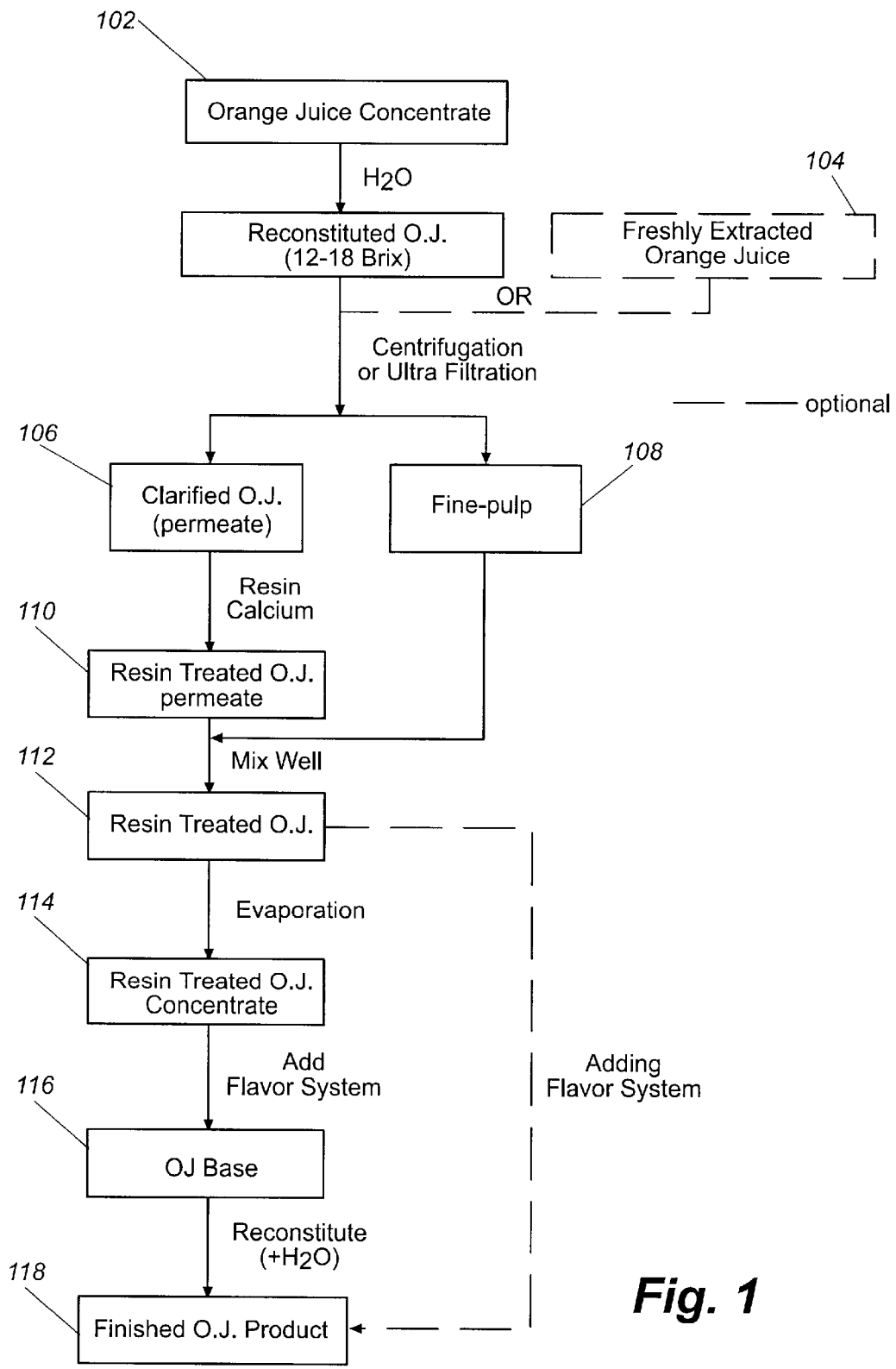
FIG. 1 provides a flow chart for the production of a fruit juice beverage and the locations in the process which the methods of the present invention may be used.

In fruit juices, it has been discovered that certain compounds affect the quality characteristics taste and/or flavor of the fruit juice. Some of these compounds provide a bitter taste to the juice, while others simply mask the true flavor of the juice while producing an off-taste or off-flavor. Freshly squeezed or single-strength fruit juice may have one or both types of off-taste or off-flavor compounds. For example, navel orange juice contains limonin compound which provides a bitter off-taste, and precursor compounds, such as ferulic acid that forms PVG during ambient storage, creates an off-flavor and/or off-taste over time. However, valencia orange juice contains only precursor compounds, and minimal, if any, amounts of limonin. Compounds that have been identified as attributing to off-flavor development during ambient storage can be roughly classified into three major categories: compounds derived from pasteurization/heat processing; compounds derived from non-enzymatic browning; and compounds derived from other degradation (i.e., Strecker degradation).

Typically, heated flavor is the most significant flavor attribute in the perception of quality and accounts for approximately 65% of the total variance with respect to the overall quality of orange juice. Traditionally, the thermally induced process flavors have been broadly viewed as products from browning reactions, because early discoveries showed the role of reducing sugars and amino compounds in the induction of a process that ultimately leads to the formation of brown pigments.

It is generally agreed that heat treatment of orange juice during pasteurization causes a heated juice flavor that increases in intensity as pasteurization conditions become more severe. Inactivation of enzymes requires even more heat treatment than pasteurization and thus contributes to flavor changes due to heat treatment. Sensory panels have been able to detect the heated flavor present in some heat-treated juice, especially those subjected to harsher time-temperature conditions. However, the components formed or changed immediately after heat-treatment have been difficult to detect, and the few changes that have been documented were not studied for their contribution to heated juice flavor.

It has been reported that pasteurization for 1 second at 85° C. (185° F.) or 16 seconds at 74° C. (165° F.) are common adequate treatments for non-hermetic seal reconstituted juice from concentrate. Pasteurization at 91° C. for 1 second was sufficient to reduce microorganisms to commercially sterile levels and to reduce enzyme (pectin methylesterase) activity by 97%. It is believed that certain compounds responsible for creating the heated/processed flavor begin to develop in the original concentrated orange juice, and only when the product is heated a second time do these compounds reach and/or exceed sensory threshold levels in orange juice made from concentrate for certain individuals.

The second category of compounds that have been identified as attributing to off-flavor development during ambient storage are compounds derived from non-enzymatic browning. Although browning reactions are almost always directly involved in the development of process flavors in foods, the interactions between degradation product of browning reaction and other food constitutes are also important and extensive to the development of other off-flavors.

Several compounds have been identified in canned single-strength orange juice after 12-weeks storage at 35° C. Most of the compounds are the degradation products of non-enzymatic browning and have impacted on the off-flavors developed during storage. These compounds may include off-flavors which grow in intensity over time or precursor compounds which eventually develop into off-flavors compounds over time.

Para-vinylguaiacol (PVG) is the most detrimental phenolic compound that contributes to an "old fruit" or "rotten" flavor in the juice. Levels of 0.075 ppm of PVG in freshly processed juice gives the juice an aged, off-flavor aroma, similar to that observed in stored juice. The formation of PVG from ferulic acid, a precursor to PVG, in orange juice has been demonstrated in a model system. The formation of PVG in orange juice during storage is dependent on time and temperature, and is accelerated by the addition of exogenous ferulic acid, with a reduction in sensory quality. The limiting step in the formation of PVG in citrus products and the resulting objectionable order, is perhaps the release of free ferulic acid from its bound forms (feruloylputrescine and feruloyllglucose) rather than the conversion of free ferulic acid to PVG. Pasteurization and an increase in mechanical pressure during fruit extraction will dramatically increase the release of ferulic acid from its bound forms. Due to its very low taste threshold (0.05 ppm) and its occurrence in levels above threshold in freshly commercial orange juice, PVG is the major off-flavor early in the storage of thermally-induced inferior quality of citrus products.

The third category of compounds that have been identified as contributing to off-flavor development during ambient storage are compounds derived from other degradation processes such as Strecker degradation.

Strecker degradation involves the interaction of α-dicarbonyl compounds and α-amino acid. Volatile products, such as aldehydes, pyrazines, and sugar fragmentation products from Strecker reaction, may contribute to aromas and flavor. Commercially, Strecker degradation is used to produce the distinctive flavors of chocolate, honey, maple syrup, and bread. Sulfur dioxide and sulfites have little effect on Strecker degradation, which is a significant pathway for the loss of essential amino acids and, hence, nutritive value. Strecker degradation reaction transfers the amino group to the dicarbonyl group and provides a means from integrating amino acid nitrogen into small compounds destined for any other condensation mechanisms envisioned in these reactions. Strecker degradation, in which decarboxylation leads ultimately to colored products, is suggested by $CO_2$ formation, loss of reducing equivalents, and a decrease in ascorbate concentration.

For some of these off-taste compounds the amount and strength of the compounds will increase over time, especially if the juice is stored in non-refrigerated conditions. Refrigeration helps to reduce the level of these compounds by slowing down or stopping the reactions by which the amount of these compounds increase. However, if the juice is stored at room temperature, these reactions will take place and the amount of the off-taste compounds will increase until the juice has such an unpleasant off-flavor and/or off-taste as to be considered undesirable and even undrinkable.

In single-strength juices, such as freshly squeezed juice, the level of the bitter compounds will generally not increase over time, unlike the off-flavor compounds. Therefore, the prior art has determined that the best way to produce drinkable fruit juices that contains high level of bitterness is to remove those bitterness compounds and then refrigerate the juice. However, these methods do not address these other off-flavor compounds except to try and prevent or slow down their formation.

The present invention offers a unique solution that is different from the prior art by substantially removing the initial amounts of the off-flavor compounds and/or the precursors to these off-flavors. Once these off-flavors or precursors are removed, the freshly treated fruit juice will not only taste better immediately after treatment, but their removal will also allow the production of quality shelf-life fruit juices wherein the flavor, taste, color, odor, mouthfeel and other sensory characteristics remain substantially the same, even if the juice is stored under non-refrigerated conditions for extended periods of time, such as one month or longer.

The present invention includes a system and method which utilize an adsorption resin. The adsorption resin is designed to remove the off-flavors and/or the precursors of off-flavors from the fruit juice. The resin does not chemically alter the juice in any way. The resin simply removes the offending compounds while the rest of the juice remains unchanged, including all the recognized nutritional substances.

The precursors to off-flavors are different from those that cause a bitter taste in juice. Bitterness compound, such as limonin, is not the compound the present invention undertakes to remove. Additionally, some juices contain little or none of these bitter compounds, yet these same juices include the off-flavors and precursors which the methods of the present invention remove. Therefore, the present invention has broader utility than those that simply remove bitterness compounds. The present invention may be used on any juice that includes off-flavors and/or precursors to off-flavor, regardless whether those juices have any bitterness compounds. The juices which may be treated include, but are not limited to, citrus juices such as orange juice, grapefruit juice, and tangerine juice; apple juice, pear juice, grape juice, pineapple juice, cranberry juice, and mixtures thereof, among others. Additionally, it is preferred to use a juice which has little or no bitterness compounds.

The resins used in the method are selected based upon the off-flavors or precursor compounds to be removed. For example, one class of resin compounds which may be used include those prepared by contacting a copolymer in a swollen state with a Friedel-Crafts catalyst under conditions effective to catalyze the post-crosslinking and rearrangement of the swollen copolymer. An example of this type of resin is shown in European Patent No. 0334641, the disclosure of which is hereby incorporated by reference. Another class of adsorbent resin compounds which may be used include Duolite ES-861 and Duolite ES-865 from Diamond Shamrock, Inc, Redwood City, Calif. as described in U.S. Pat. No. 3,238,153, the disclosure of which is hereby incorporated by reference.

These adsorbent resins are used to substantially remove the off-flavors or precursor compounds residing within the juice. The total amount removed will vary, depending upon the types of juice treated and the initial level of the off-flavor compounds and/or the precursors. Desirably, passing the juice through the resin will generally result in the removal of a minimum of 30% the total amount of compounds, and preferably greater than about 40% of the total amount of compounds, and most preferably greater than about 50% of the total amount as determined by various markers that associate with the off-flavor compounds and/or the precursors.

Once these compounds are substantially reduced, the treated juice will immediately taste better. Additionally, since substantial amount of all the compounds have been removed, the treated juice may be stored under non-refrigerated conditions without the development of off-flavors. It is preferred that the treated juice, after storage for about 1 month at a temperature from about 65° F. to about 100° F., contains less than about 80% of the total original amount of the compounds in untreated juice, and preferably less than about 70% of the total amount, and most preferably less than about 60% of the total amount. With these reduced levels of compounds, the shelf-stable juices of the present invention will have an extended quality shelf life such that they will be able to be stored under non-refrigerated conditions for periods of time as long as six months, and maybe even longer, without the development of off-flavors or off-taste.

The methods of the present invention may be used at various points throughout a system for producing a fruit juice beverage. FIG. 1 illustrates a flow diagram of one embodiment for forming a fruit juice beverage. In these methods, either fruit juice concentrate 102 illustrated in this embodiment which has been reconstituted or single strength fruit juice 104 described in this embodiment as orange juice may be used. A filtering step is provided to remove any pulp within the juice to form a juice permeate 106. The pulp is removed 108 since it may clog the adsorption resin column. If desired, the pulp may be added at a later stage. The juice permeate may then be passed through the adsorption resin 110 to remove substantially all of the off-flavors or precursors of off-flavors or other quality impairing characteristics.

After the juice is passed through the resin, it may be remixed with the pulp to form a resin-treated fruit juice 112, to which a flavor system is added to produce a finished fruit juice product 118. Alternatively, the pulp may be re-added to form a resin-treated fruit juice which is then evaporated to form a resin-treated fruit juice concentrate 114. This concentrate may be packaged and shipped or sold as a separate product. Or, a flavor system may be added to form a fruit juice base 116. The fruit juice base may then be reconstituted to form the finished fruit juice product.

In other embodiments, the adsorption resin step may be placed at other locations in the process. For example, the resin step may be the last step in the process before the fruit juice is packaged. This is especially applicable for those juice products which contain little or no pulp. Alternatively, the resin step may be used to treat an orange juice concentrate. Therefore, there is no location within a system for making a fruit juice product in which the method cannot be placed, as long as the juice can physically pass through the resin. While it is preferred that the juice be substantially free of pulp when it is passed through the resin, it is possible to pass pulped juice through the resin as well. However, there appears to be no added benefit for passing any pulp through the resin.

The manner in which the off-flavors or precursors are removed is dictated by the amount of off-flavors or precursors within the juice, the desired level of removal, and the effectiveness of the adsorption resin at removing the precursors. In general, if a juice has a high level of off-flavors or precursors, the juice should either be passed slowly through the resin, or should be exposed to a high volume of resin. Each of these possibilities will provide ample opportunities for the adsorption resin to contact the off-flavor or precursor and absorb it onto the resin at binding sites located therein. If a high level of off-flavors or precursors is desired to be removed, then the juice must be given adequate contact time to achieve this result. However, if the resin has been subjected to a large amount of bed volumes, the binding sites may already be substantially filled with off-flavors or precursors. Therefore, if the resin has started to lose its effectiveness, the resin may be either replaced or recharged by flushing with a regeneration fluid which removes the bound off-flavors or precursors and takes them from the system. The resin used in the present invention will preferably be replaced or recharged after about 80 bed volumes have been passed through the adsorption resin column. More preferably, the resin will be replaced or recharged after about 50 bed volumes, and most preferably, the resin will be replaced or recharged after about 30 bed volumes. However, the actual time for replacement or recharging will vary on the type of juice treated, its level of off-flavors or precursors, and the type of resin used.

The apparatus used to carry out the methods of the present invention is not critical. In general, any resin column may be used as long as it contains an inlet, an outlet, an area for holding the adsorption resin and means for passing the juice through the resin. These means may include a pump, or gravitational force or other forces that may act on the juice to pass it through the resin. The column may be operated in various flow orientations including an up-flow or down-flow manner, and the system may include multiple columns linked either serially, to allow for higher contact times, or in parallel, to allow for higher volumes of the juice to be treated at one time. Automatic control means and sensors may be used to test the juice at different points to ensure that the desired off-flavor or precursor removal level has been attained and to help determine the times when the process should be stopped to allow for regeneration or replacement of the adsorption resin media. Automatic control means in conjunction with a plurality of columns operating in parallel and a valve system will allow the system to operate continuously by permitting one column to be shut down for regeneration or replacement while the other columns continue to operate.

The apparatus may be used in a system for producing a fruit-juice beverage, and especially a shelf-stable fruit juice beverage, having an extended quality shelf life. The system may comprise a standard fruit juice beverage making system, but having the adsorption resin column incorporated therein. As discussed previously, since the adsorption resin may be used at different points in the process, the location of the resin column within the system may also vary. The system comprises, in general, a supply of either single strength juice or juice from concentrate, the adsorption resin column, and means for packaging the fruit juice beverage. The fruit juice beverage may be packaged in a variety of different packages including, but not limited to, plastic bottles, glass bottles, cans, aseptic packages and vacuum packs. The juice may also be commercially sterilized in a variety of methods utilized in producing shelf-stable juices including, but not limited to, ultra high pressure (UHP) treatment, pause electric field (PEF) treatment, ultra violet (UV) treatment, ultrasonic treatment, ozone treatment, and electronic ARC discharge technology.

The system may also comprise other components such as means for removing solids, such as pulp, from the juice. These means could include one or multiple fixed strainers, ultra filtration units, centrifuges, or like means. Additionally, the system may include means for supplying additives such as sweetening agents, flavor components, preservatives, nutritional or vitamin fortifications, pH adjusters, or mixtures thereof to the juice. The system may also include an evaporator for forming fruit juice concentrate, and means for adding water to reconstitute the juice. Finally, if microbial treatments such as pasteurization or other beverage manufacturing processes such as carbonation of the beverage are desired, then means for performing these functions may also be included.

The present invention is further illustrated by the following examples, which are not to be construed in any way as imposing limitations upon the scope thereof. On the contrary, it is to be clearly understood that resort may be had to various other embodiments, modifications, and equivalents thereof which, after reading the description herein, may suggest themselves to those skilled in the art without departing from the spirit of the present invention and/or the scope of the appended claims.

EXAMPLES

Example 1.

To 2 gallons of valencia orange juice (18° brix, 4% (v/v) fine-pulp), about 200 ml of the XAD-16 resin (Rohm and Haas Company, Philadelphia, Pa.) was added and gently stirred for one minute every 20 minutes. The resin was separated from the juice, one hour later, by 80 mesh sieve. The treated orange solids were then diluted to the final single strength (11.8° Brix) and flavor systems were added for packing. The hot-packed products were stored at 95° F. and withdrawn weekly for evaluation by an expert panel for up to 3 weeks.

The results indicated that product with resin treated orange solids tasted significantly better than the controls. It had much less heated/cooked and off-oil flavors, which is true for samples withdrawn at 1, 2, and 3 weeks of storage at 95° F. The off-flavors developed in the control samples reached objectionable levels after one week of storage.

Example 2.

The orange solids with different fine pulp levels (0, 4, and 10%, v/v) were treated with the resin individually in a similar manner as described in Example 1. Non-resin-treated orange solids were used as the control. A total of 9 variables with about 3 gallons product of each were hot-packed and stored at 95° F. for two weeks before being evaluated by the expert panel.

The results showed that the products with resin-treated orange solids had very little off-flavors while the control products tasted typically hot-packed and had strong off-flavors (cooked/heated notes and off oils). The difference between resin-treated and not resin-treated samples was much more significant than the difference between different pulp levels.

Example 3–4.

To confirm the promising results from the laboratory studies and to explore the technical feasibility of commercialization, a scale-up pilot plant production was conducted. Orange concentrate blend (30 gallons, 65° brix) was diluted with hot water (90° F.) to about 16° brix and passed through an ultra-filtration unit to removing the fine-pulp (retentate). The pulp-free orange serum (permeate) was then pumped through a commercial column filled with clean and equilibrated XAD-16 resin (7 gallons) at a rate of 2–3 gallons per minute. The resin treated orange permeate was blended with retentate and then concentrated to about 65 brix.

The resin-treated orange solids were used in two separate packing systems: 1) chilled orange juice; and 2) hot-packed shelf-stable orange juice. Both packing systems used non-resin treated orange solids (from same lot as resin-treated) as the control. The same flavor system was used for both the control and the resin-treated samples within the same product types. The products were tested by consumers at pre-selected time periods.

The results (Tables 1 & 2) demonstrated that even with the same flavor system, the product packed with resin treated orange solids was significantly better than their respective controls. The DA panel results confirmed consumer results that pre-treatment of orange solids with resin XAD-16 significantly improved the quality of both chilled and hot-packed orange juice when compared with the non-resin-treated controls.

TABLE 1

Effect of Resin-Treatment on the Likability of Chilled Orange Juices*

| Samples | 3 weeks | 6 weeks | 8 weeks |
|---|---|---|---|
| Control | 6.3 | 6.4 | 6.4 |
| Resin-treated sample | 7.1 | 6.9 | 7.1 |

*Products were stored at 45° F. The likability is expressed as the hedonic scores in a 9-point scale with 1 as extremely dislike and 9 as extremely like. Scores in the 3 and 8 week columns are significantly different at 5% confidence level while scores in the 6-week column is significantly different at 10% confidence level.

TABLE 2

Effect of Resin-Treatment on the Likability of Shelf Stable Orange Juices*

| Samples | 5 weeks | 10 weeks | 15 weeks |
|---|---|---|---|
| Control | 6.2 | 5.7 | 5.5 |
| Resin-treated sample | 6.9 | 6.5 | 6.1 |

*Products were stored at 78° F. The likability is expressed as the hedonic scores in a 9-point scale with 1 as extremely dislike and 9 as extremely like. All scores in the same column are significantly different at 5% confidence level.

Accordingly, as can be seen by the preceding the present invention provides a method of enhancing the flavor and overall quality of a fruit juice beverage. The present invention also provides a method of producing a shelf-stable fruit juice beverage with an extended quality shelf life. Additionally, the present invention provides a fruit juice beverage with enhanced taste and quality characteristics. Finally, the present invention provides a shelf-stable fruit juice beverage with an extended quality shelf life.

What is claimed is:

1. A method of making a citrus juice beverage comprising:

selecting a citrus juice including off-flavor compounds, precursor compounds, or both, and no bitterness; and passing the citrus juice containing off-flavor compounds, precursor compounds, or both through an adsorption resin to produce a resin-treated citrus juice having reduced levels of the off-flavor compounds, precursor compounds, or both.

2. The method of claim 1, wherein the citrus juice is selected from orange juice, and tangerine juice, or mixtures thereof.

3. The method of claim 1, further comprising the step of removing fine-pulp from the citrus juice prior to passing the citrus juice through the adsorption resin.

4. The method of claim 1, further comprising the step of concentrating the citrus juice after passing the citrus juice through the adsorption resin to form a resin-treated concentrate.

5. The method of claim 4, further comprising the step of adding an additive to the resin-treated concentrate to form a citrus juice base, wherein the additive is selected from sweeteners, flavor systems, pH adjusters, or mixtures thereof.

6. The method of claim 5, further comprising the step of reconstituting the citrus juice base to form a finished citrus juice product.

7. The method of claim 1, further comprising the step of adding an additive to the resin-treated citrus juice to form a finished citrus juice product, wherein the additive is selected from sweeteners, flavor systems, pH adjusters, or mixtures thereof.

8. The method of claim 1, wherein the citrus juice is selected from single strength citrus juice, freshly squeezed citrus juice, or citrus juice concentrate which has been reconstituted.

9. The method of claim 1, wherein greater than about 30% of the off-flavor compounds, precursor compounds, or both are removed as measured by their markers.

* * * * *